United States Patent
Langlois

(10) Patent No.: US 10,234,537 B2
(45) Date of Patent: Mar. 19, 2019

(54) DIRECTIONAL BEACON

(71) Applicant: Otter Products, LLC, Fort Collins, CO (US)

(72) Inventor: Christopher R. Langlois, Fort Collins, CO (US)

(73) Assignee: Otter Products, LLC, Fort Collins, CO (US)

(*) Notice: Subject to any disclaimer, the term of this patent is extended or adjusted under 35 U.S.C. 154(b) by 477 days.

(21) Appl. No.: 15/095,915

(22) Filed: Apr. 11, 2016

(65) Prior Publication Data

US 2016/0341811 A1 Nov. 24, 2016

Related U.S. Application Data

(60) Provisional application No. 62/163,629, filed on May 19, 2015.

(51) Int. Cl.
  *G01S 5/02* (2010.01)
  *G01S 1/20* (2006.01)
  *G01S 1/10* (2006.01)

(52) U.S. Cl.
  CPC ............ *G01S 5/0284* (2013.01); *G01S 1/10* (2013.01); *G01S 1/20* (2013.01); *G01S 5/0252* (2013.01)

(58) Field of Classification Search
  CPC ........ G01S 1/20; G01S 5/0252; G01S 5/0284; G01S 5/02
  USPC ..................................................... 342/387
  See application file for complete search history.

(56) References Cited

U.S. PATENT DOCUMENTS

| | | |
|---|---|---|
| 6,608,592 B2 | 8/2003 | McReynolds |
| 8,847,754 B2 | 9/2014 | Buchheim et al. |
| 8,878,671 B2 | 11/2014 | Buchheim et al. |
| 9,125,165 B2 | 9/2015 | Gonikberg |
| 9,137,771 B2 | 9/2015 | Wrappe |
| 9,366,746 B2 | 6/2016 | Kazerouni |
| 2008/0211671 A1 | 9/2008 | Daily |
| 2010/0130230 A1 | 5/2010 | Aggarwal et al. |
| 2010/0289646 A1 | 11/2010 | Raniere |
| 2011/0140884 A1 | 6/2011 | Santiago et al. |
| 2012/0223834 A1 | 9/2012 | Hyatt |
| 2014/0297900 A1 | 10/2014 | Herbert et al. |
| 2015/0296476 A1 | 10/2015 | Wilmhoff et al. |

*Primary Examiner* — Dao L Phan

(57) ABSTRACT

A beacon includes a housing, multiple directional radio frequency antennas, a multiplexer, and a signal source that produces a signal output. The directional radio frequency antennas are attached to the housing such that each directional radio frequency antenna points out radially from an axis of the housing in a direction different than the other directional radio frequency antennas. The multiplexer is electrically connected to each of the directional radio frequency antennas and to the signal source. The multiplexer is configured to sequentially conduct the radio signal output from the signal source to each of the directional radio frequency antennas to produce a wireless signal, wherein the signal output is only conducted to one of the directional radio frequency antennas at any given time and includes a unique identifier identifying the antenna it is currently being transmitted from. The beacon may also include electrical hardware for performing time of flight measurements.

20 Claims, 3 Drawing Sheets

DIRECTIONAL BEACON

CROSS-REFERENCE TO RELATED APPLICATIONS

This application claims priority to U.S. Provisional Patent Application No. 62/163,629 filed on May 19, 2015, which is hereby incorporated by reference in its entirety.

FIELD

The present disclosure relates to determining locations of objects. More specifically, the present disclosure provides improved apparatuses, methods, systems, and techniques for determining a location of an object relative to a beacon.

BACKGROUND

Portable electronic devices have become ubiquitous and users increasingly rely on portable electronic devices for a variety of tasks. Portable electronic devices may include devices such as smartphones, cellular phones, tablet computers, mobile computing devices, digital cameras, fitness trackers, two-way radios, video players, audio players, and/or other types of portable electronic or communication devices, including combinations thereof.

There is an increasing need to determine locations of portable electronic devices, particularly in indoor locations. It may be desirable to determine the location of a device for a variety of reasons including: because the portable electronic device has been misplaced or lost, to locate a person carrying the portable electronic device, to determine a presence of the person or the portable electronic device within a specified area, to conduct targeted marketing activities, to conduct location based marketing activities, to interface with an Internet-of-things system, and/or to perform other functions related to the location of the portable electronic device, including combinations thereof.

While Global Positioning Satellite (GPS) receivers are often used to determine a location of an electronic device, use of GPS methods typically requires including a GPS receiver in the device and may also require that the device have an unobstructed, or somewhat unobstructed, view of the sky. Improved methods are needed for locating devices in indoor environments and/or without requiring a GPS receiver. Some existing indoor location systems indicate whether a portable electronic device is within range of the system without providing an indication of where the portable electronic device is relative to the system. Further, some systems determine a distance, range, or radius of the portable electronic device from the system without providing a direction and/or without determining an angular relationship of the device to the system. In some cases, this is solved by adding more nodes to the system and performing triangulation or trilateration calculations. However, more nodes increases the complexity of the system, the cost of the system, and/or the complexity of installing and configuring the system. Therefore, improved methods of determining locations of objects relative to a single node or beacon are needed.

SUMMARY

Apparatuses, methods, systems, and techniques for determining a location of an object relative to a beacon are provided. In one exemplary embodiment, a beacon includes a housing, directional radio frequency antennas, a signal source, and a multiplexer. The directional radio frequency antennas are attached to the housing such that each directional radio frequency antenna points out radially from an axis of the housing in a different direction than the other directional radio frequency antennas. The signal source produces a signal output. The multiplexer is electrically connected to each of the directional radio frequency antennas and to the signal source. The multiplexer is configured to sequentially conduct the radio signal output from the signal source to each of the directional radio frequency antennas to produce a wireless signal, wherein the signal output is only conducted to one of the directional radio frequency antennas at any given time. The signal includes a unique identifier identifying the antenna it is currently being transmitted from. Time of flight measurements may also be performed between the object and the beacon to determine a range or distance of the object from the beacon.

While multiple embodiments are disclosed, other embodiments will become apparent to those skilled in the art from the detailed description that follows. The apparatuses, methods, systems, and techniques disclosed herein are capable of modification in various aspects, all without departing from the scope of the present invention. Accordingly, the figures and detailed description are to be regarded as illustrative in nature and not restrictive.

BRIEF DESCRIPTION OF THE DRAWINGS

Embodiments of the present invention will be described and explained through the use of the accompanying drawings in which.

DETAILED DESCRIPTION

In the following detailed description, various specific details are set forth in order to provide an understanding of and describe the apparatuses, techniques, methods, systems, and computer-executable software instructions introduced here. However, the techniques may be practiced without the specific details set forth in these examples. Various alternatives, modifications, and/or equivalents will be apparent to those skilled in the art without varying from the spirit of the techniques introduced. For example, while the embodiments described herein refer to particular features, the scope of this solution also includes embodiments having different combinations of features and/or embodiments that may not include all of the disclosed features. Thus, the scope of the techniques introduced herein are intended to embrace all such alternatives, modifications, and variations as fall within the scope of the claims, together with all equivalents thereof. Therefore, the description should not be taken as limiting the scope of the invention, which is defined by the claims.

Figure 1:
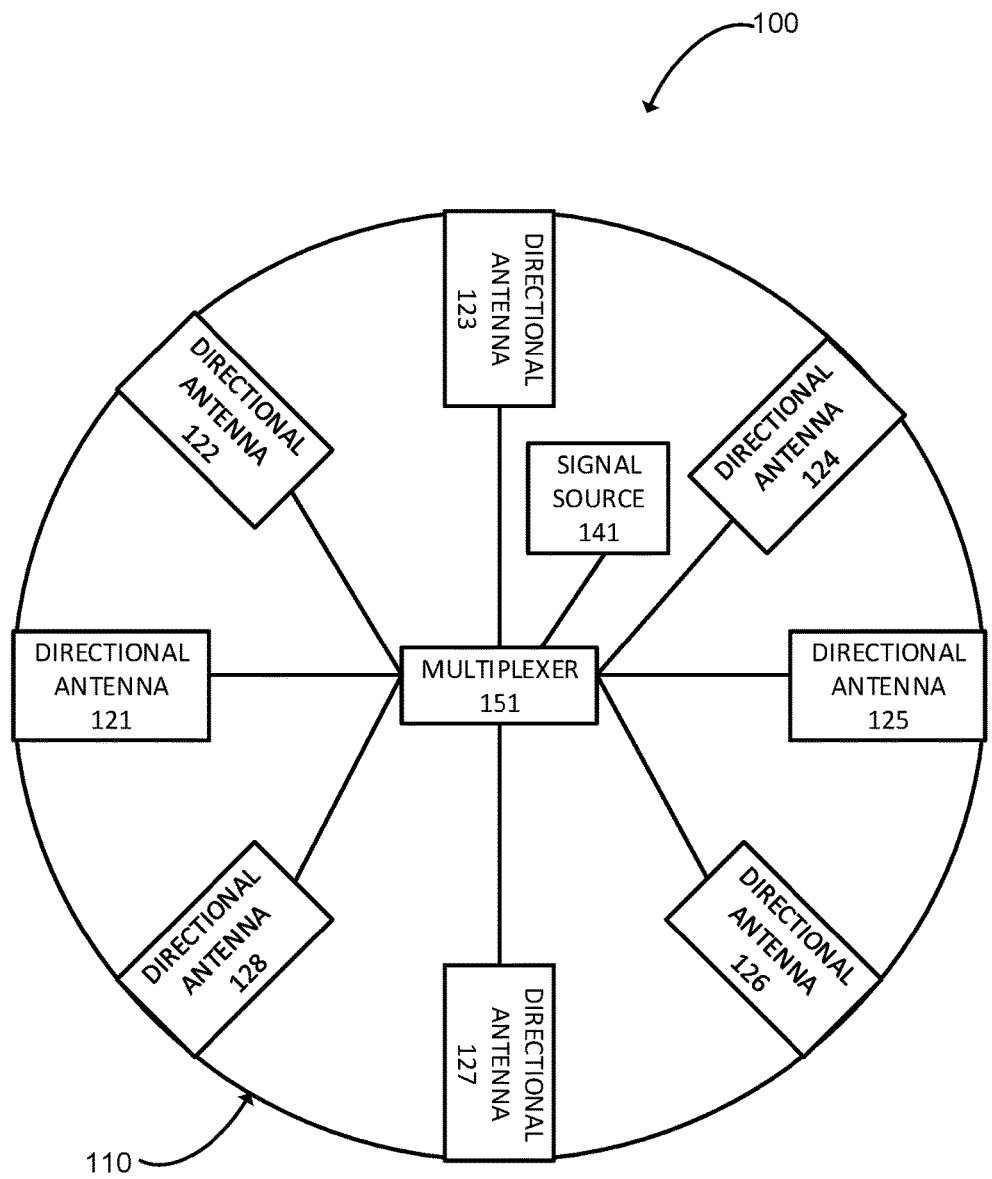
FIG. 1 illustrates a beacon for transmitting a wireless signal for determining locations of objects.
Figure 1:

FIG. 1 illustrates a beacon 100 for transmitting a wireless signal for determining locations of objects (not pictured). Beacon 100 includes a housing 110, directional antennas 121-128, signal source 141, and multiplexer 151. While the various examples provided herein are described with specific numbers of directional antennas, the apparatuses, methods, system, and techniques disclosed herein may be implemented using different numbers of directional antennas. For an example, an apparatus or system may be implemented in accordance with the techniques disclosed herein using three, four, five, six, seven, eight, nine, ten, eleven, twelve, or more directional antennas.

Housing 110 contains the other components of beacon 100 and may act as a structural foundation for mounting these other components and/or provide structural support for these other components. In some cases, housing 110 may completely enclose the other components such that they are not visible and/or protect them from outside forces or elements such as water, rain, snow, dirt, dust, debris, tampering, sunlight, and/or impact. While housing 110 is illustrated as being circular, other shapes and configurations are possible.

Directional antennas 121-128 each include any type of antenna for transmitting radio frequency (RF) waves or signals in a directional, somewhat directional, or partially directional manner. A directional antenna may be any antenna which radiates greater power in one or more directions. A directional antenna may radiate power in a variety of directions. However, the antenna may still be described as directional because it transmits more effectively in one direction and transmits more power or peak power in that direction. Directional antennas 121-128 each have a pointing direction that is associated with the directional characteristics of the antenna. In some cases, one or more of the antennas disclosed herein may be implemented on a printed circuit board, on a flexible circuit substrate, or as a ceramic chip antenna.

In the example of FIG. 1, the pointing direction of each of directional antennas 121-128 is roughly perpendicular to the perimeter of housing 110 such that each of directional antennas 121-128 points in a different direction radially from a central axis of housing 110, where the axis of housing 110 extends directly out of and perpendicular to the drawing sheet. Directional antennas 121-128 may be positioned to transmit primarily in the same plane. Further, antennas 121-128 may be equidistantly spaced such that the angular relationship between and two of the directional antennas is approximately the same as the angular relationship between any other two adjacent directional antennas of the beacon. While directional antennas 121-128 are illustrated as discrete components, two or more of directional antennas 121-128 may be included in a single module or package. Further, beacon 100 may be configured such that all of directional antennas 121-128 are included in a single module or assembly.

Signal source 141 includes any electrical or electronic device for generating an RF signal for transmission by beacon 100. In some examples, signal source 141 may be a transmitter adapted or configured to generate a signal corresponding to one or more wireless communication standards. For example, signal source 141 may include a Bluetooth transmitter, a Bluetooth Low Energy (BLE) transmitter (sometimes also referred to as a Bluetooth Smart transmitter), a Wireless Fidelity (Wi-Fi) transmitter, and/or a transmitter configured or adapted to produce signals according to one or more other wireless communication standards. For reasons explained in further detail below, beacon 100 may be well suited for use with wireless communication standards designed for transmitting relatively low power levels and/or over relatively short distances. Signal source 141 is illustrated as a single device but may comprise multiple devices or elements. Alternately, the functions of signal source 141 may be distributed across one or more other elements of beacon 141.

Multiplexer 151 is any electrical or electronic device for receiving the output of signal source 141 and conducting or transferring that output to one or more of directional antennas 121-128. In this example, multiplexer 151 provides the output to only one of directional antennas 121-128 at any particular time. In some cases, depending on convention, multiplexer 151 may also be described as a demultiplexer (or de-multiplexer). Although the terms multiplexer and demultiplexer are sometimes used in directional manners, the terms are used interchangeably herein because, as described in further detail below, the system may be operated in a bi-directional manner in some configurations.

Through use of multiplexer 151, directional antennas 121-128 share or make time division multiplexed use of the signal from signal source 141. However, in some configurations, one or more of directional antennas 121-128 may contain or be associated with its own signal source or may share a signal source with one or more other antenna of antennas 121-128.

Multiplexer 151 is configured or adapted to transmit the output of signal source 141 to one of directional antennas 121-128 at any given time. Multiplexer 151 is further configured or adapted to periodically sequence between or cycle among directional antennas 121-128 such that each, individually, transmits the output of signal source 141 for a short period of time. Over a longer period of time, all of directional antennas 121-128 will have transmitted the output during a portion of the period of time.

Some of the examples herein are discussed with respect to the directions of north, south, east, and west, where beacon 100 is viewed from overhead in FIG. 1 and north is up. Angular measurement is described as clockwise from a zero degree point which is the same as north. Other orientation schemes are possible.

An object positioned some distance from beacon 100 will receive the signals transmitted by one, some, or all of directional antennas 121-128. However, the power levels received from each of these antennas will vary based on the directional relationships between the object and beacon 100. Even though directional antennas 121-128 may be configured to transmit the same level of power in their pointing direction, the object will see various power levels from the various directional antennas due to their directionality. For example, an object some distance to the west of beacon 100 will receive the strongest signal from directional antenna 121, with weaker signals being received from each of directional antenna 122 and 128 because they have directional characteristics but do not transmit in a narrow beam. The object may are or may not also receive even weaker signals from directional antennas 123, 127, 124, 126, and 125. However, in the case that directional antennas with narrower beams are used, the object may receive a signal from only one or only two of the directional antennas at any given time.

Based on a comparison of the received signal strengths at the object, a determination can be made that the object is west, or mostly west, of beacon 100. If the object were to begin moving a little farther to the north, it would still be receiving a relatively strong signal from directional antenna 121. At the same time signal from directional antenna 122 would increase in strength while the signal from directional antenna 128 would decrease in strength.

In another example, an object at 135 degrees from north would receive a strong signal from directional antenna 126, while also possibly receiving somewhat equally weaker signals from directional antenna 125 and directional antenna 127. The object may receive even weaker signals from directional antennas 124 and 128, while the signal from directional antennas 121, 123, and 122 may be even weaker, or not received at all. In other words, the location of an object or receiver at any angular direction around beacon 100 can be roughly estimated by receiving signals from the various directional antennas of beacon 100 and making relative comparisons of the signal strengths of those received signals.

In some cases, the location may be estimated by interpolating based on the received signal strengths from adjacent antennas on beacon 100. In one simple example, if an object is receiving a signal of a first strength from directional antenna 126 and a signal of a lesser strength from directional antenna 127, it may be determined that the angular relationship of the object to beacon 100 is between the angle of directional antenna 126 and directional antenna 127. Further, the relative signal strengths may be compared determine that the angular relationship of the object is closer to that of directional antenna 126 than to directional antenna 127. Further, interpolation may be performed to determine how much closer the angular relationship of the object is to directional antenna 126 than directional antenna 127.

Because signal strengths may vary and may be affected by a number of environmental factors, the techniques disclosed herein may not provide angular accuracy or granularity down to a few degrees, but may provide accuracies of +/−10 degrees, +/−20 degrees, +/−30 degrees, +/−40 degrees, +/−45 degrees, or +/−50 degrees depending on the environment, the matching of the antennas, and/or the capabilities of the receiver. While this level of directional granularity may be less than that provided by other types of systems, this level of granularity may be sufficient for particular needs and can be beneficially be provided by the simpler and/or lower cost apparatuses, systems, and methods disclosed herein.

In some cases, beacon 100 may contain a magnetic compass or other direction determining device for automatically configuring itself relative to north and/or for automatically assigning unique identifiers to the antennas in accordance with one or more of the schemes disclosed herein. Beacon 100 may also contain a physical, electrical and/or software interface for configuration, monitoring, maintenance, and/or troubleshooting of the device.

The examples above are discussed with respect to the receiving object being in or near the sample plane that contains the pointing directions of directional antennas 121-128. Depending on the azimuthal characteristics of directional antennas 121-128, the relative signal strength relationships will remain roughly the same when the azimuth of the object changes although the ratios of these relationships may change as the object reaches more extreme azimuths relative to the plane.

Further, if the output signal strength of the directional antennas is known, a radial distance of the object from beacon 100 may be estimated using the strength of the signal received at the object and known characteristics about the degradation of the signal or decrease in strength of the signal over distance. In some cases, this radial distance may be referred to as the range of the object. In some cases, the power measurement of the signal received at the object may be a received signal strength (RSSI) measurement.

Figure 3:
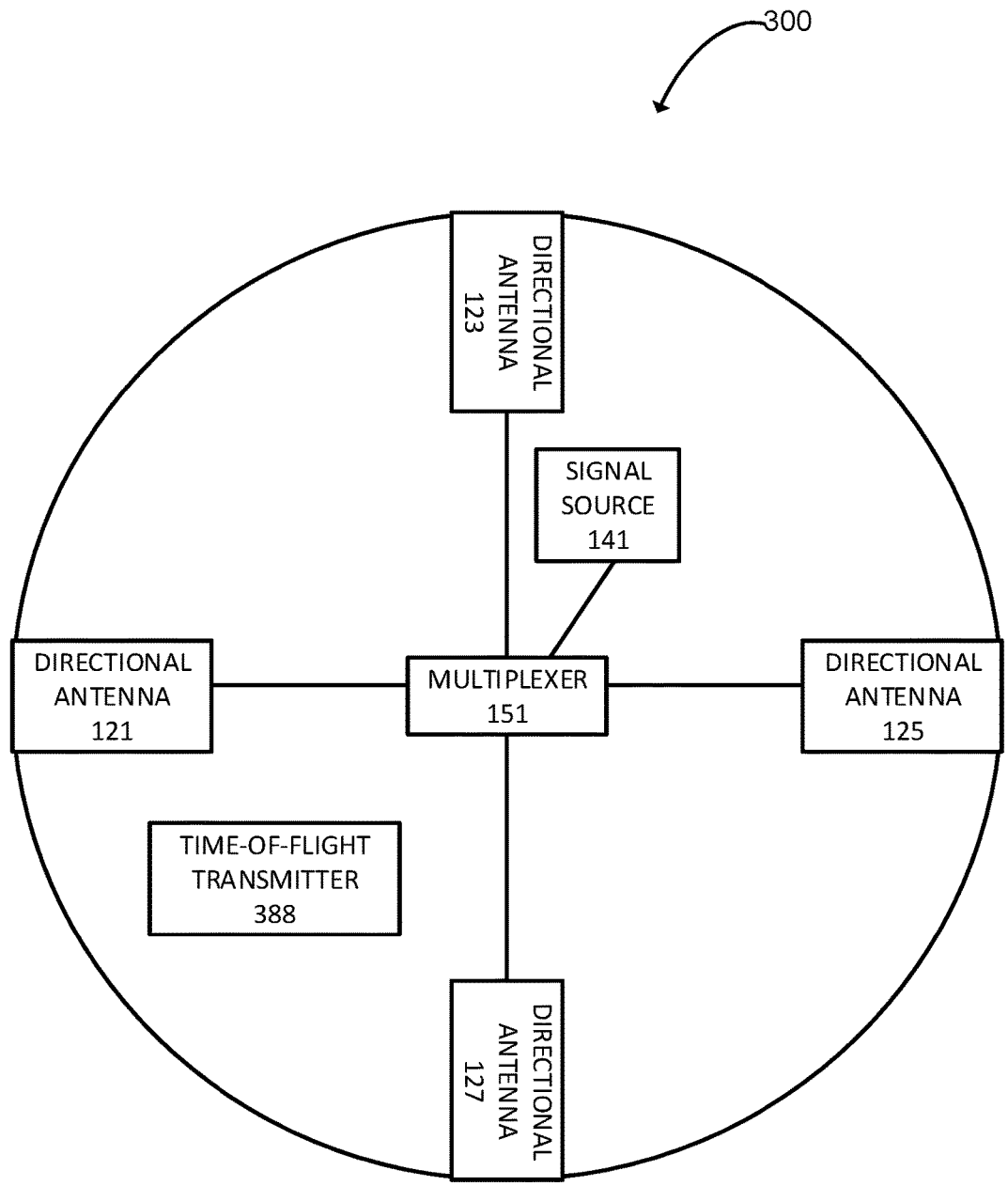
FIG. 3 illustrates a beacon for transmitting a wireless signal for determining locations of objects.

In some cases, the methods of directional or angular determination described herein may be included with a method of determining range other than signal strength. In one example, the method of angular determination described herein may be combined with a time of flight measurement that is used to determine range in order to complete the location determination. In this example, beacon 100 may include the circuitry for performing the time of flight measurement. For example, FIG. 3 illustrates a beacon 300 for transmitting a wireless signal for determining locations of objects. Beacon 300 may have any of the features, functions, characteristics, or elements of beacon 100 of FIG. 1. In addition to signal source 141, beacon 300 also includes time-of-flight transmitter 388. Time-of-flight transmitter 388 transmits signals for determining a range or distance of an object from beacon 300 using time of flight measurement techniques. Time-of-flight transmitter 388 may include a separate antenna or may make use of one or more of directional antennas 121, 123, 125, and/or 127. Beacon 300 also includes directional antennas 121, 123, 125, and 127. Beacon 300 may include more of fewer directional antennas in other examples. Combining the directional or angular determination methods disclosed herein with other methods of range determination is also possible.

Based on the directional or angular determination, as well as the range determination, the location of an object or receiver can be determined relative to a beacon. For example, the object or receiver may be a smartphone, a tablet computers, or another type of mobile computing device. It may be convenient for a signal source to transmit a Bluetooth, BLE, or Wi-Fi signal because many smartphones, tablet computer, and portable computing devices already include receivers for receiving one or more of these types of signals. Consequently, many portable electronic devices may already be equipped for receiving these types of signals from a beacon.

Returning to the example of FIG. 1, while beacon 100 is transmitting a signal from various of directional antennas 121-128 at different times, the receiver or receiving device will only see a single signal at any given time because the output signal source 141 of beacon 100 is time division multiplexed among directional antennas 121-128. In order to assist the receiving device in determining which directional antenna the signal was received from at any particular time, the signal transmitted from beacon 100 may include unique identifiers that are associated with each antenna. For example, the signal may include one identifier value when transmitting from directional antenna 121, another identifier value when transmitting from direction antenna 122, another identifier value when transmitting from directional antenna 123, etc. In one example, the unique identifiers contain the callout numbers associated with the direction antennas in FIG. 1. In this way, the receiving device can use unique identifiers to assist in the location determination process through knowing when the output has switched from one directional antenna to another and/or knowing which signals are generated by antennas that are adjacent to each other.

Further, beacon 100 may be installed or configured relative to magnetic earth, compass, and/or physical directions such that particular identifiers are known to be associated with the associated antenna(s) facing particular directions. For example, beacon 100 may always be installed such that the antenna with an identifier ending 1 is always pointing west while the antenna with an identifier ending in 5 is always point east. Many other configurations are possible and may vary based on number of antennas and may accommodate systems in which there are multiple beacons. For example, the unique identifier may also include a unique identifier for the beacon and the unique identifier for the beacon may include absolute coordinates of the beacon such that an absolute location of the receiver can be calculated or estimated. In another variation, the unique identifier may include an angular relationship associated with the beacon. For example, the unique identifier for directional antenna 125 may include the value "90" representing 90 degrees from due north or ninety degrees from a starting direction.

Beneficially, using the techniques disclosed herein, an approximate location of an object can be determined relative to a single beacon without utilizing another beacon or device, without using a mesh network, and without performing triangulation. Further, the cost of the beacon is reduced because it needs only a single transmitter or signal generation source and may use relatively simple antennas. Finally, the techniques may be easily implemented because many portable electronic devices already include a receiver for receiving one or more of these types of signals and because the because is designed to transmit only a single signal at any given time.

In one example of use, a beacon of the type described herein may be placed in a user's home or a commercial building for identifying the locations of items, such as mobile phones within the home or building. A mobile phone may receive signals from the beacon to determine its own location using the techniques disclosed herein and then transfer that determined location to another device. In this way, a misplaced mobile phone can more easily be found within the home or building. While many of the examples provided herein are described with respect to the functions being performed in a mobile phone or a portable electronic device, any of these functions may also be performed in a dedicated module or tag that can be attached to any device, including non-electronic devices or devices that do not have wireless communication capabilities.

In some examples of use, a business may track users' locations using these techniques and provide information to them based on their location. In one example, a shopping mall may provide targeted advertisements to customers based on what store or stores within the shopping center they are near. In another example, a business may wish to provide directions to a customer regarding how to find an item or a department within the business. Directions may be provided to the customer electronically based on where the customer is currently located. In other words, the directions may be customized to take the customer's current location into account.

In other examples, the location or approximate location of an object may be useful for purposes of engaging with or interfacing to an Internet-of-things system or similar ecosystem which monitors the locations and/or other characteristics of items or objects. Many other applications and commercial use cases are possible.

Beacon 100 may also include other elements or features for implementing the functions or features described herein. For example, beacon 100 may include a computer processor, programmable logic, memory, software, logic, analog electrical components, digital electrical components, RF components, electrical connectors, and/or a battery for powering one or more of the components of beacon 100. Further beacon 100 may include a visual or audible indicator for indicating a status and/or a visual interface for configuring or interacting with the beacon, such as a liquid crystal display or a touch sensitive display. Further, beacon 100 may include one or more electrical interconnects for interfacing beacon 100 to another device, such as to an external power supply.

A software application, or "app," may include non-transitory software instructions that are stored in a memory and executed on one or more computer processors of a portable electronic device to direct the computer processors to perform the analysis of the signals received from a beacon, such as beacon 100 or beacon 300, for determining a location of the portable electronic device relative to the beacon in accordance with the techniques disclosed herein. In some cases, the non-transitory software instructions may be logic which controls, configures, or directions operation of electronic hardware, such as a computer processor. The software application, when executed by the one or more computer processors, may direct the portable electronic device to perform a method, such as method 200 of FIG. 2.

Figure 2:
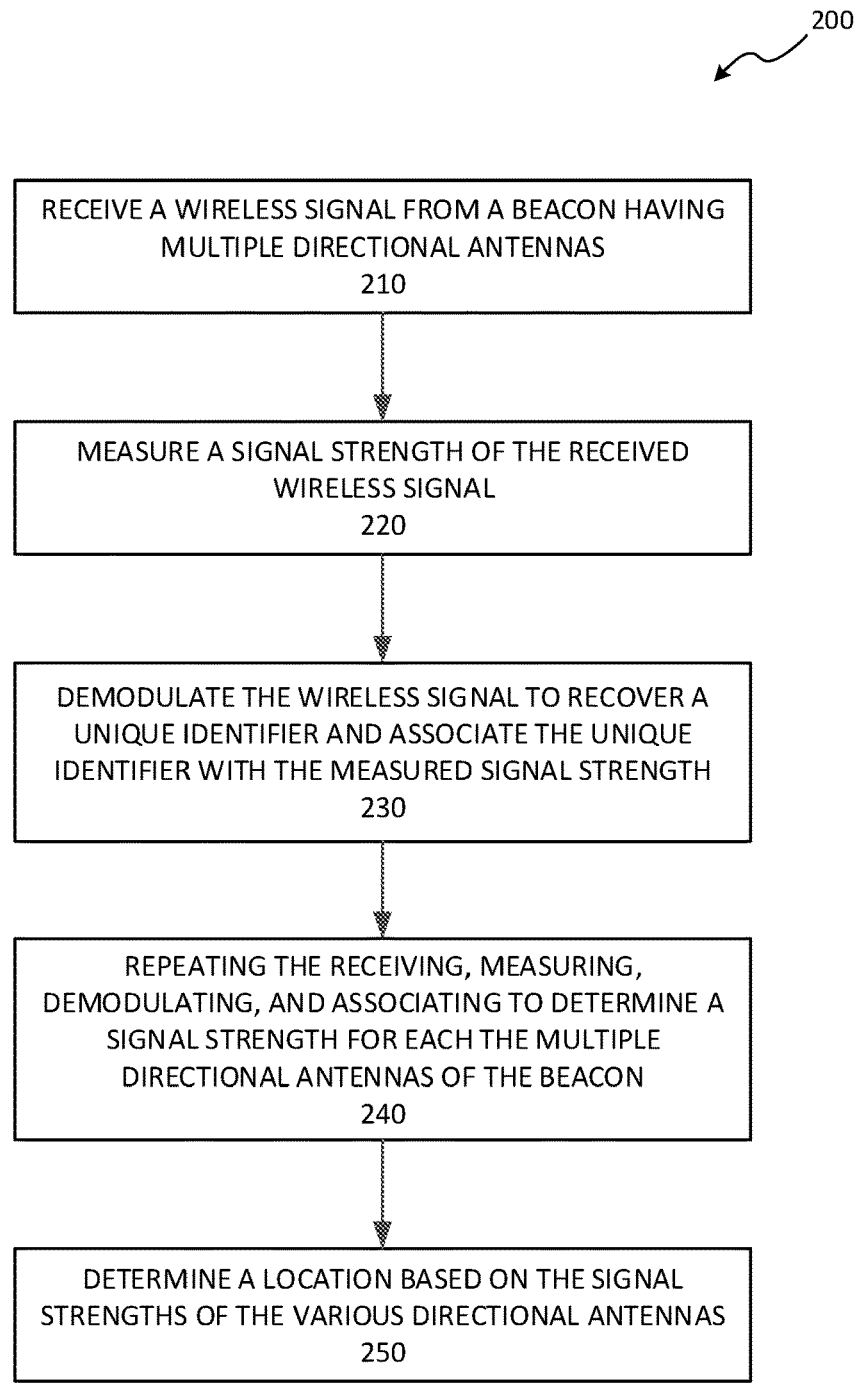
FIG. 2 illustrates a method of determining a location of a portable electronic device.

In the example of FIG. 2, method 200 includes the steps of receiving a wireless signal transmitted from a beacon having multiple antennas (step 210) and measuring a signal strength of the received wireless signal (step 220). The method may also include demodulating the wireless signal to recover a unique identifiers associated with various directional antennas of the beacon and associating the unique identifier with the measured signal strength received from the respective antenna (step 230). Further, the method may include repeating the receiving, measuring, demodulating, and associating to determine a signal strength for each of the directional antennas of the beacon (step 240). Finally, a method implemented by the software application running on the portable electronic device may cause the portable electronic device to determine a location of the portable electronic device relative to the beacon based on a comparison of the relative signal strengths for each of the directional antennas, as determined using the unique identifiers (step 240). Many variations of method 200 are possible based on the various techniques and examples provided herein.

In some implementations, the device which receives the signals from beacon 100 may transmit the gathered information to another device for performing the location determinations and/or calculations. In one example, the receiving device transmits the information to a remote computer system. In another example, the receiving device transmit the information to beacon 100 and beacon 100 performs the location determination/or calculations.

In some cases, one or more software applications used to facilitate the functions described herein may be downloaded from a remote server and/or over a network, such as the Internet. In other cases, software to facilitate the methods and processes described herein may be stored on the beacon and downloaded directly to a portable computing or communication device using one or more of the directional antennas.

In some cases, the techniques disclosed herein may be implemented in the form of a system having one or more beacons and one or more portable or mobile electronic devices that operate according to the examples provided herein. In some cases, the techniques disclosed herein may be implemented in the form of a system having one or more beacons and one or more instances of a software application, as described above. In some system configurations, multiple beacons of the type disclosed herein may be utilized and information derived from those multiple beacons may be combined or consolidated.

In one variation, a beacon may also include additional directional antennas having pointing directions in planes other than the plane of the directional antennas of FIG. 1. The inclusion of additional directional antennas in other planes, operated in a similar manner to that of directional antennas 121-128, enables the location determination capabilities described herein to be expanded into three dimensions and/or to a third axis.

In one example, beacon 100 also includes directional antennas having pointing directions along the axis of housing 110 (directly into and out of FIG. 1). In this way, signal strengths of signals received from these antennas may be used to estimate azimuth relative to beacon 100. If further azimuthal resolution is desired, additional directional antennas may be included at various azimuthal angles of beacon 100. In some cases, these additional antennas may be described as "azimuthal" antennas. In some cases, a plurality of additional directional antennas may be spaced equidistantly in a spherical or hemispherical fashion to perform location determinations in three dimensions.

In some variations, the additional "azimuthal" directional antennas may be either more or less directional than directional antennas 121-128. In other words, these additional antennas may have broader or narrower beam patterns than directional antennas 121-128. In some cases, these additional antenna(s) may be positioned to cover only one hemisphere for installations in which a beacon may be attached to a ceiling or placed on a floor where the other hemisphere is not applicable or not of interest.

In one variation of the examples described herein, the apparatuses, beacons, and systems described herein may also be operated in a reverse manner. For example, each of directional antennas 121-128 may be operated as a receiving antenna with multiplexer 151 switching between the antennas to route signals received from the antennas to a single RF receiver. A portable electronic device, such as a smartphone, transmits an RF signal that is received by one of directional antennas 121-128 at a time while the input to the receiver is switched among the antennas. The relative signal strengths received at each of directional antennas 121-128 can be used to determine an approximate angle of the transmitting portable electronic device relative to the antennas and to the beacon, similar to other examples disclosed herein. The range or distance of the portable electronic device from the beacon can also be determined using signal strength measurements and/or one of the other techniques disclosed herein. A beacon operating in this manner may be capable of simultaneously receiving signals from multiple portable electronic devices and determining their respective locations based on identifiers included in the signals that uniquely identify each of the portable electronic devices.

The components described above are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the teachings and disclosure provided herein. The embodiments described and discussed herein were chosen to explain the principles of the concept and its practical application to enable those skilled in the art to best utilize the invention. It is intended that the claims be construed to include other alternative embodiments of the invention, except as limited by the prior art.

The phrases "in some embodiments," "according to some embodiments," "in the embodiments shown," "in other embodiments," "in some cases," "in other cases," "in some examples," "in other examples," "in some situations," "in one configuration," "in another configuration," and the like generally mean that the particular technique, feature, element, structure, or characteristic following the phrase is included in at least one embodiment of the present invention and/or may be included in more than one embodiment of the present invention. In addition, such phrases do not necessarily refer to the same embodiments or to different embodiments.

What is claimed is:

1. A beacon for generating location determination signals, the beacon comprising:
   a housing;
   a plurality of directional radio frequency antennas attached to the housing such that each directional radio frequency antenna points out radially from an axis of the housing, wherein each directional radio frequency antenna points in a different direction than the other directional radio frequency antennas, and wherein each of the plurality of directional radio frequency antennas is associated with a respective unique identifier;
   a signal source producing a signal output;
   a multiplexer electrically connected to each of the plurality of directional radio frequency antennas and to the signal source, the multiplexer configured to sequentially conduct the signal output from the signal source to each one of the plurality of directional radio frequency antennas to sequentially transmit a first wireless signal from the plurality of directional radio frequency antennas, wherein the first wireless signal includes the unique identifier associated with the directional radio frequency antenna from which it was transmitted for determining an angle relative to the beacon; and
   a transmitter for transmitting a second wireless signal for determining a range from the beacon based on a time of flight of the second wireless signal.

2. The beacon of claim 1 further including an additional directional radio frequency antennas that point along the axis of the housing.

3. The beacon of claim 1 wherein the plurality of directional radio frequency antennas includes four, five, six, seven, eight, nine, or ten directional radio frequency antennas.

4. The beacon of claim 1 wherein the unique identifier associated with each of the directional radio frequency antennas includes an identifier of the beacon and an indication of a physical direction associated with the respective directional radio frequency antenna.

5. A method of determining a position of a portable electronic device with respect to a beacon sequentially transmitting a wireless signal from four or more directional antennas wherein the wireless signal is varied to include a unique identifier identifying the one of the four or more directional antennas from which it is transmitted at the time, the method comprising:
   receiving, at the portable electronic device, the wireless signal;
   measuring, at the portable electronic device, a signal strength of the received wireless signal;
   demodulating, at the portable electronic device, the wireless signal to recover the unique identifier and associating the unique identifier with the measured signal strength;
   repeating the receiving, measuring, demodulating, and associating to determine a signal strength for each of the four or more directional antennas; and
   determining a location of the portable electronic device relative to the beacon based on the signal strengths for each of the four or more directional antennas.

6. The method of claim 5 wherein determining the location of the portable electronic device relative to the beacon includes determining a range of the portable electronic device from the beacon and determining an angle relative to a known orientation of the beacon, wherein the angle is determined based on interpolation.

7. The method of claim 6 wherein determining the range of the portable electronic device from the beacon includes performing a time of flight measurement between the beacon and the portable electronic device.

8. The method of claim 6 wherein determining the range of the portable electronic device from the beacon includes comparing the signal strengths to each other.

9. The method of claim 5 wherein the unique identifier includes information indicating a relative position of the associated directional antenna relative to the other directional antennas.

10. The method of claim 4 wherein the wireless signal is a Bluetooth Low Energy or Bluetooth Smart signal.

11. The method of claim 4 wherein determining the location based on the signal strengths includes transmitting the signal strengths and associated unique identifiers to another device for determining the location.

12. The beacon of claim 1 wherein the signal source comprises a Bluetooth Low energy transmitter or a Bluetooth Smart transmitter.

13. The beacon of claim 1 further comprising a power source for powering one or more of the signal source, the multiplexer, the transmitter, and the plurality of directional radio frequency antennas.

14. An apparatus for generating signals used to determine a location of an object relative to the apparatus, the apparatus comprising:
  four or more directional antennas each having a pointing direction, the four or more antennas attached to a structure and spaced equidistantly about an axis of the structure such that the pointing directions of the directional antennas point out from the structure substantially in a plane and such that an angular spacing between the pointing directions of any adjacent two of the directional antennas is about the same as an angular spacing between the pointing directions of any other adjacent two of the directional antennas; and
  a first signal source configured to sequentially transmit a radio signal from the four or more directional antennas, wherein the radio signal is transmitted from only one of the four or more directional antennas at a time and wherein each of the four or more directional antennas has a unique identifier, the radio signal being modulated to include the unique identifier associated with the antenna from which it is being transmitted at the time for determining an angle of the object relative to the apparatus; and
  a second signal source configured to transmit a time of flight signal from the apparatus, the time of flight signal for determining a distance of the object from the apparatus.

15. The apparatus of claim 14 wherein the unique identifier includes information indicating a direction of the associated directional antenna relative to the other directional antennas.

16. The apparatus of claim 14 wherein the radio signal is one or more of: a Bluetooth signal, a Bluetooth Smart Signal, a Bluetooth Low Energy signal, and a Wireless Fidelity (WiFi) signal.

17. The apparatus of claim 14 further comprising one or more additional directional antennas each having a pointing direction substantially outside of the plane for determining an azimuth of the object relative to the apparatus.

18. The apparatus of claim 17 wherein the one or more additional directional antennas is two additional directional antennas and the two additional directional antennas are attached to the structure such that they point in opposite directions substantially along the axis of the structure for determining an azimuth of the object.

19. The apparatus of claim 14 wherein the one or more signal sources is a single signal source that is multiplexed between the four or more directional antennas.

20. The apparatus of claim 14 wherein the one or more signal sources is a number of signal sources equaling a number of the directional antennas and each of the directional antennas is associated with a dedicated one of the signal sources.

* * * * *